United States Patent
Ku et al.

(10) Patent No.: US 9,565,148 B2
(45) Date of Patent: Feb. 7, 2017

(54) METHOD AND APPARATUS FOR PROCESSING MICRO WEB LOG MESSAGES

(71) Applicant: TENCENT TECHNOLOGY (SHENZHEN) COMPANY LIMITED, Shenzhen (CN)

(72) Inventors: Yu Ku, Shenzhen (CN); Li Zhang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 704 days.

(21) Appl. No.: 13/915,467

(22) Filed: Jun. 11, 2013

(65) Prior Publication Data

US 2013/0304836 A1    Nov. 14, 2013

Related U.S. Application Data

(63) Continuation of application No. PCT/CN2011/084893, filed on Dec. 29, 2011.

(30) Foreign Application Priority Data

Jan. 11, 2011  (CN) .......................... 2011 1 0004639
Jan. 30, 2011  (CN) .......................... 2011 1 0032729

(51) Int. Cl.
    *G06F 15/16*      (2006.01)
    *H04L 12/58*      (2006.01)
    (Continued)

(52) U.S. Cl.
    CPC .......... *H04L 51/10* (2013.01); *G06F 17/30861* (2013.01); *G06Q 10/10* (2013.01); *H04L 51/32* (2013.01)

(58) Field of Classification Search
    CPC .......... H04L 51/10; H04L 12/58; G06F 17/24; G06F 17/3089; G06F 17/30861; G06F 17/30056
    See application file for complete search history.

(56) References Cited

U.S. PATENT DOCUMENTS

| | | | |
|---|---|---|---|
| 2008/0184135 A1 | 7/2008 | Washburn et al. | ............ 715/752 |
| 2009/0099919 A1* | 4/2009 | Schultheiss | ............ G06Q 10/00 705/14.1 |

(Continued)

FOREIGN PATENT DOCUMENTS

| | | |
|---|---|---|
| CN | 101017483 A | 8/2007 |
| CN | 101079057 A | 11/2007 |

(Continued)

OTHER PUBLICATIONS

Hidekazu Kubota, "Development of a Web technology enabling dynamic spatial expression" The world of new computers/networks penetrating into societies, Information Processing, Japan, Information Processing Society of Japan, Jan. 15, 2010, vol. 51, No. 1.

(Continued)

*Primary Examiner* — Benjamin M Thieu
(74) *Attorney, Agent, or Firm* — J.C. Patents

(57) ABSTRACT

Embodiments of the present invention disclose a method and an apparatus for processing micro web log messages in a micro web log system, where a unified rich media control is configured in each client side in the micro web log system, and the rich media control is obtained by encapsulating rich media information processing logics according to an operation type and a media type of rich media information. The method includes: receiving, by the client side in the micro web log system, an operation request for processing rich media information in a micro web log message; and invoking, by the client side in the micro web log system, a corresponding rich media control according to the operation (Continued)

type and the media type of the requested rich media information, and running the control to process the rich media information properly.

26 Claims, 13 Drawing Sheets

(51) Int. Cl.
*G06F 17/30* (2006.01)
*G06Q 10/10* (2012.01)

(56) References Cited

U.S. PATENT DOCUMENTS

| | | | |
|---|---|---|---|
| 2009/0150797 A1* | 6/2009 | Burkholder | G06F 17/30056 715/747 |
| 2010/0070876 A1* | 3/2010 | Jain | G06Q 30/02 715/748 |
| 2012/0110432 A1* | 5/2012 | Mei | G06F 17/248 715/233 |

FOREIGN PATENT DOCUMENTS

| | | |
|---|---|---|
| CN | 101136025 A | 3/2008 |
| CN | 101158981 A | 4/2008 |
| CN | 101179474 A | 5/2008 |
| CN | 101196914 A | 6/2008 |
| CN | 101207627 A | 6/2008 |
| CN | 101779199 A | 7/2010 |
| CN | 101895834 A | 11/2010 |
| JP | 2007-074240 A | 3/2007 |
| JP | 2009-535733 A | 10/2009 |
| WO | WO 2007/130495 A2 | 11/2007 |

OTHER PUBLICATIONS

Japanese Examination Report of corresponding Japan patent Application No. 2013-548723, dated Sep. 17, 2014.
International Search Report of International Application No. PCT/CN2011/084893, dated Mar. 22, 2012.
Chinese First Examination Report of corresponding China Application No. 201110032729.3, dated Jul. 3, 2013.
He, Quanrong, "Photos of the space album could be downloaded in bulk" PC fan, No. 16, (2010), p. 61.
Sato, Tetsuji et al., "The front line of database $5^{th}$ installment information base technology" bit, Japan, Kyoritsu Shuppan Co., Ltd., (May 1, 2000), vol. 32, No. 5, pp. 77-84.
The Chinese First Examination Report of correspondence China patent application No. 201110004639.3, dated Dec. 30, 2015.
The extended European Search Report and the European Search Opinion of corresponding European Application No. 118355431.0, dated Jun. 16, 2016, which is a corresponding of International PCT Application PCT/CN2011/084893.

* cited by examiner

METHOD AND APPARATUS FOR PROCESSING MICRO WEB LOG MESSAGES

CROSS-REFERENCE TO RELATED APPLICATIONS

This application is a continuation of International Application No. PCT/CN2011/084893, filed on Dec. 29, 2011, which claims priorities to Chinese Patent Application No. 201110004639.3, filed on Jan. 11, 2011, and Chinese Patent Application No. 201110032729.3, filed on Jan. 30, 2011, all of which are hereby incorporated by reference in their entireties.

FIELD OF THE TECHNOLOGY

The present invention relates to the field of computer technologies, and in particular, to a method and an apparatus for processing micro web log messages in a micro web log system.

BACKGROUND

Nowadays the online instant messaging (Instant Messaging, IM) tool has been accepted by a vast majority of web users and has become an indispensable software tool of users. It is widely applied not only in the everyday entertainment but also in the users' work. Therefore, the users impose high requirements on IM software in terms of easy-to-use, stability, security, and so on. The IM software primarily enables one-to-one chat between two friends and one-to-many message chat in a group or a discussion group. With development of Internet applications, a micro blog (the word "blog" derives from and is also known as web log) applications similar to twitter are booming (twitter is a variation of an instant messaging mode used in a twitter website, and allows a user to send his/her latest news and ideas to a wireless terminal or a personalized website group by means of a short message service). Such a micro blog ("microblog" for short) service allows a user to publish about 140 Chinese characters. Such a means leads to very rapid propagation and transmission of information, and enhances the user's message chat mode from one-to-one and one-to-many to one-to-infinite. The one-to-infinite mode means that an individual can propagate a message to an infinite number of persons, and can also receive information published by tens of thousands of users. Therefore, such a technology imposes new requirements on applications used by a large quantity of users.

The IM occurs in the form of a dialog. It is characterized by the most original and the most natural interaction mode but low efficiency. It generally takes many dialogs to express a complete meaning. A blog occurs in the form of a document, and is intended to no definite audience. Its meaning is relatively complete, but initiating a blog is relatively difficult. A microblog occurs in the form of a short message, and is intended to no definite audience, but its meaning is relatively complete. Initiating a micro blog is easy. For example, a user may publish a sentence or an emoticon. Therefore, compared with IM messages and blogs, a microblog is characterized by higher efficiency of transmitting information and easier initiation. As a new product and new application extending the IM message propagation mechanism, the microblog grows rapidly.

Information presented by microblog client side software is primarily messages. In existing microblog client side products, information is primarily presented in the form of messages, but little rich media information such as images, music and video is presented. In the existing microblog client side products, the microblog content in the form of various pages such as home page are presented to users for reading in a variety of dimensions. Other types of pages such as list page (including "Search Microblog Users" and "My Audience List Message", and so on) also need to present the microblog message content.

Various pages such as message page (such as various pages or home page mentioned above) and list page in an existing microblog system present the microblog message content in different manners, and there is no reuse between different pages. In this way, to process a microblog message that carries rich media information on various pages, it is necessary to execute corresponding logics on each page respectively, which unavoidably brings many problems such as code logic redundancy, lower microblog system efficiency, and maintenance difficulty.

With development of microblog client side software products, it is necessary to combine microblog applications with various services (such as download service). The microblog system provides a common platform area for presenting various service logics. On the common platform area, control policies need to be exercised for various service logics so that various services can boost further development of the microblog.

SUMMARY

Embodiments of the present invention provide a method and an apparatus for processing micro web log messages so as to reuse the same or similar logics of processing rich media information on message pages of a client side in a micro web log system.

In the method for processing micro web log messages according to an embodiment of the present invention, a unified rich media control is configured in each client side in the micro web log system, where the rich media control is obtained by encapsulating rich media information processing logics according to an operation type and a media type of rich media information. The method includes:

receiving, by the client side in the micro web log system, an operation request for processing rich media information in a micro web log message; and invoking, by the client side in the micro web log system, a corresponding rich media control according to an operation type and a media type of the requested rich media information, and running the control to process the rich media information properly.

An apparatus for processing micro web log messages according to an embodiment of the present invention includes:

a configuring module, configured to configure a unified rich media control, where the rich media control is obtained by encapsulating rich media information processing logics according to an operation type and a media type of rich media information;

a receiving module, configured to receive an operation request for processing rich media information in a micro web log message; and a processing module, configured to invoke a corresponding rich media control according to the operation type and the media type of the requested rich media information, and run the control to process the rich media information properly.

With the embodiments of the present invention, rich media information processing logics are encapsulated beforehand according to an operation type and a media type of rich media information to obtain a unified rich media control, and the rich media control is configured on each client side of a micro web log system. In this way, when receiving an operation request for processing the rich media information in a micro web log message, the client side of the micro web log system can invoke the corresponding rich media control according to the operation type and the media type of the requested rich media information, and run the control to process the rich media information properly. Therefore, on the one hand, the rich media information in the micro web log message is processed; on the other hand, because the rich media control is configured on the client side uniformly, the reuse of the rich media information can be realized on different pages. That is, by encapsulating the corresponding logics, the reuse can be realized on various message pages of the client side in the micro web log system, and users have more ways of presenting information.

BRIEF DESCRIPTION OF THE DRAWINGS

To illustrate the technical solutions in embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these drawings without creative efforts.

DETAILED DESCRIPTION

Embodiments of the present invention provide a technical solution to implementing reuse of microblog rich media messages. A microblog message published by a user may include not only traditional text information that is not more than 140 Chinese characters, but also diversely present rich media information such as images, music, video, and so on, allowing the user to present microblog message contents in many ways and meeting the user's manifold requirements. When the content of the user's microblog message needs to be presented in multiple scenarios on a microblog client side, the rich media information may be encapsulated properly, and logics of presenting the rich media information may be controlled properly. With this technical solution, multiple message pages and list pages can reuse the same processing logic.

Embodiments of the present invention are detailed below with reference to the accompanying drawings.

Figure 1:
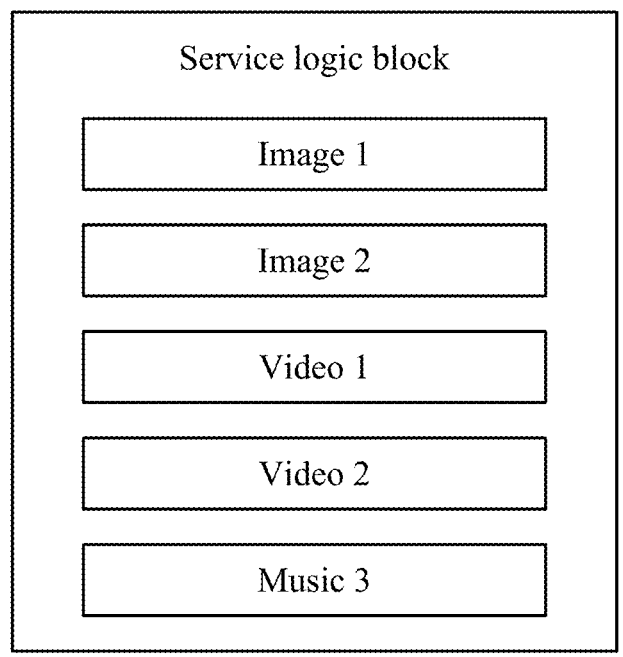
FIG. 1 is a schematic diagram of a service logic block in a microblog message according to an embodiment of the present invention.

In embodiments of the present invention, in order to make a microblog message carry rich media information, and, in order to facilitate processing of the rich media information in the microblog message, a specific service logic block may be set in the microblog message to exclusively carry rich media information of services, such as images, music and videos. As shown in FIG. 1, a service logic block "Rich-MediaCtrl" is set in a microblog message to carry media-related information of image 1, image 2, video 1, video 2, and music 3, such as media type, link address, displayed image size, audio/video duration, and so on. In this way, a variable "CWBlogMsgData" can be used to transmit information about the corresponding rich media information when the rich media information in the microblog message subsequently needs to be processed, thereby deciding a control to be invoked and/or an execution process applied to the control.

Figure 2:
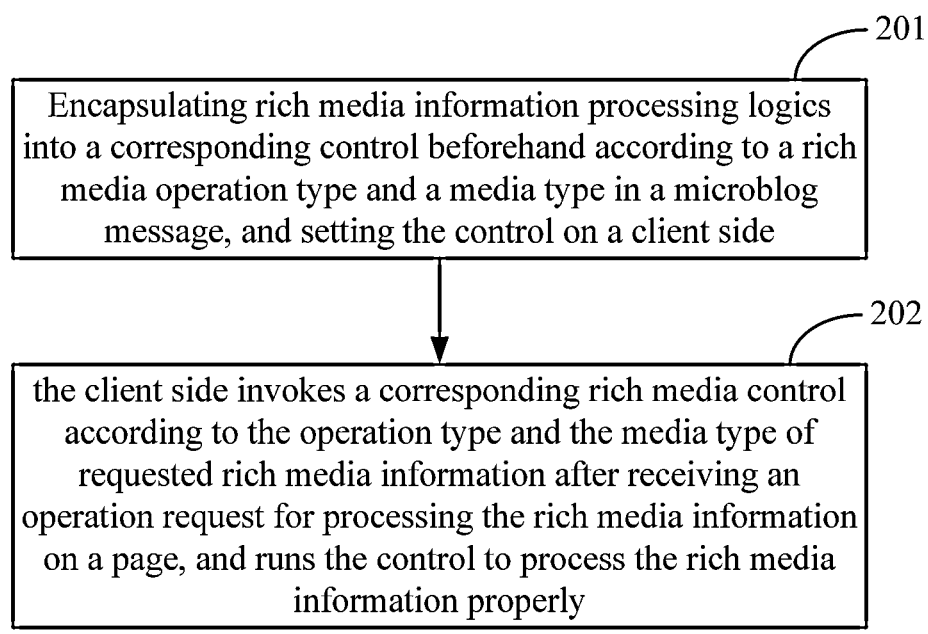
FIG. 2 is a schematic flowchart of a method for processing a microblog message according to an embodiment of the present invention.

As shown in FIG. 2, a method for processing a microblog message provided in an embodiment of the present invention may include two stages. At a development stage (step 201), rich media information processing logics are encapsulated into a corresponding control beforehand according to a rich media operation type (for example, click an audio link, click a thumbnail, load an image, and so on) and a media type (for example, image, audio, video, and so on) in the microblog message. The control may be set on a client side (if the control is encapsulated in a client side installation program, the setting of the control on the client side is completed upon completion of installing the client side). At the application stage (step 202), after receiving an operation request for processing rich media information on a page, the client side in the microblog system invokes the corresponding rich media control according to the operation type and the media type of the requested rich media information, and processes the rich media information properly by running the control.

Specifically, at the development stage, processing logics that deal with the user's operations on a microblog page may be encapsulated into the rich media control. Subcontrols of finer granularity may be included in the rich media control. The subcontrols are independent of each other. For example, according to the type of the user's operation on the page such as moving cursor in, moving cursor out, clicking, and so on, the corresponding processing logics are set and encapsulated in the rich media control as a subcontrol;

and/or, according to the operation of loading microblog pages, the corresponding processing logics are set and encapsulated in the rich media control as a subcontrol. To support processing of diverse rich media information, for each operation type, the processing logic of each different type of rich media information may be encapsulated as a corresponding rich media control respectively, depending on the media type.

For example, for an operation of clicking an image thumbnail and an operation of clicking an audio/video link by a cursor, a processing logic is set and encapsulated respectively. In this way, for each page element related to rich media information processing on a page such as microblog message page or list page, only an instance variable of RichMediaCtrl needs to be saved. Therefore, when the user operates the page element, the corresponding control is invoked to create an instance, and the corresponding rich media information is processed according to parameters conveyed by the instance variable by running the instance. In another example, the processing logic is set and encapsulated for the operation of loading an image, the operation of loading an audio, and the operation of loading a video respectively.

Further, inside the rich media control, one or any combination of the following functions may be set:

Maintaining display order of all service logics according to a priority level of each service. Here a service is termed relative to a platform. As a carrying platform, the music, videos, images, and so on, which are specific services, need to be processed. Each service has a different priority level, and the priority level is a service attribute. Specifically, different display priority levels may be set according to the rich media information type. The priority level of a service decides whether the service is displayed first or later. For example, if the top priority level is set for an image loading control, images will be displayed first when a microblog client side initializes microblog pages.

(2) Controlling to display or hide a type of rich media information as required in a login process. Specifically, a setting interface may be provided for the microblog client side. On the setting interface, a user may set a display or hide attribute for one or more types of rich media information (or default settings also can be applied in the system). Correspondingly, when the client side initializes a microblog page, whether to invoke a loading control of a corresponding media type can be decided according to the setting of the attribute. In this way, every time when the microblog client side initializes the microblog page, the corresponding type of rich media information may be displayed or hidden according to the setting.

(3) Internally maintaining control for the number of presentation of the same type of rich media information.

(4) Enabling functions available in the embodiment of the present invention as required for published client sides of various versions at a time.

The above configuration information may be set in the following way: encrypting control parameters of corresponding functions in the form of configuration files, and then encapsulating them together with the client side version, for example, encapsulating them together with each version of a client side installation program or with a version update program, and therefore, the configuration information is set into the client side in the process of installing the client side or updating the version. In this way, roaming control on a server side can be implemented, and the settings of control parameters can be updated anytime.

The following gives a detailed description about a logic for implementing an image control inside a rich media control, taking an image processing process as an example.

Figure 3:
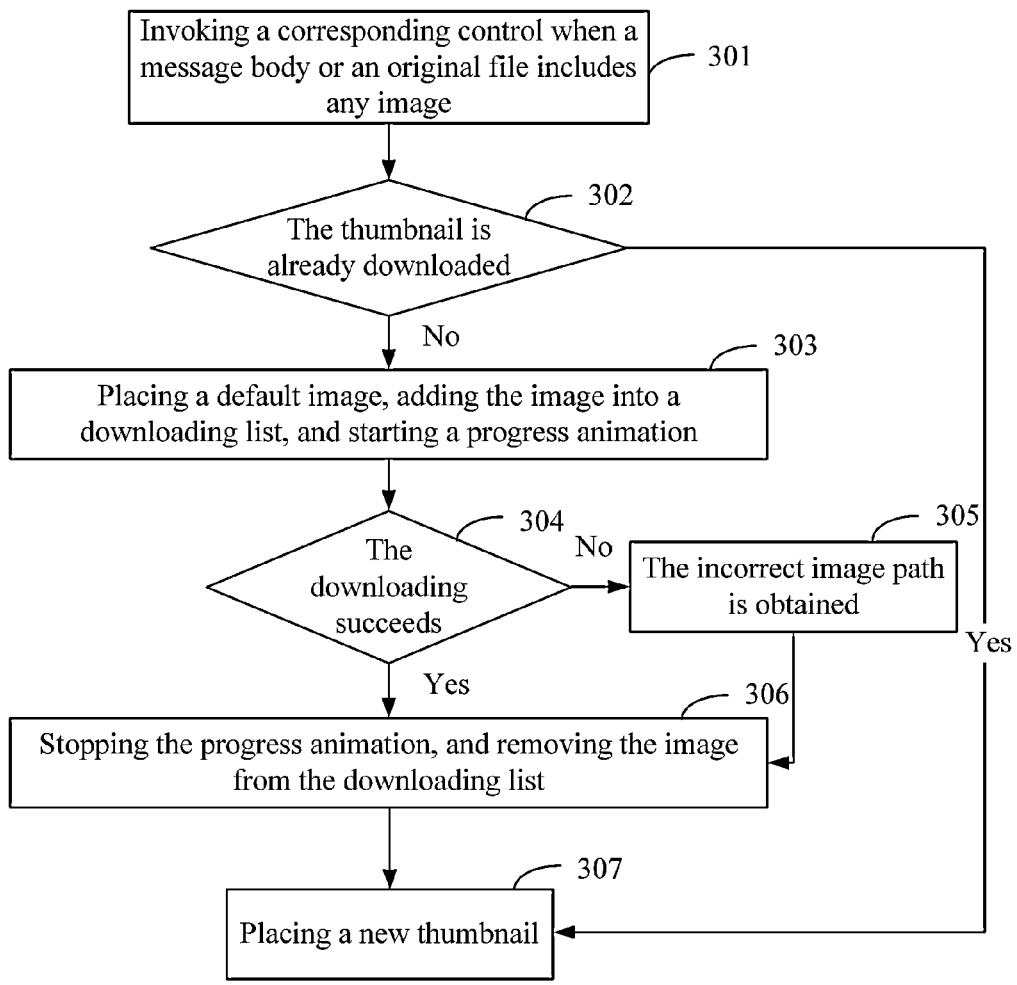
FIG. 3 is a schematic flowchart of downloading a thumbnail according to an embodiment of the present invention.

Generally, if a microblog message body or an original file includes an image, a thumbnail of the image will be presented on the microblog page. As shown in FIG. 3, the process of downloading the thumbnail includes the following steps:

Step 301: invoking a control for loading an image thumbnail if the client side determines that an image exists in a microblog message body or an original file when a page is initialized.

In this step, according to a logic control area in the microblog message, the client side knows that the microblog message includes the image when the page is initialized. Therefore, the client side invokes the control for loading the image thumbnail, creates a corresponding instance and, by using a CWBlogMsgData variable, may transmit a link address of the image in the logic control area to the instance as an input parameter of the instance.

The following operations are performed by the instance created by the control invoked by the client side:

Step 302: judging whether the thumbnail is downloaded completely. If the downloading is complete, proceeding to step 307; otherwise, proceeding to step 303.

Step 303: displaying a default image in a position where the thumbnail is displayed, adding an image link in the microblog message into a download list to download the image, and starting animation for showing download progress.

Step 304: judging whether the downloading succeeds. If the downloading succeeds, proceeding to step 306; otherwise, proceeding to step 305.

Step 305: locating the unsuccessfully downloaded image link in the download list, and proceeding to step 306.

Step 306: stopping displaying the download progress animation, removing the image link in the microblog message from the download list, and proceeding to step 307.

Step 307: placing the completely downloaded thumbnail in a proper location.

In the above process, the step of judging whether the thumbnail is already downloaded is optional. This judging and the processing performed accordingly can avoid repeated downloading of the thumbnail that is already downloaded, improve processing efficiency, and save network overhead.

Figure 4:
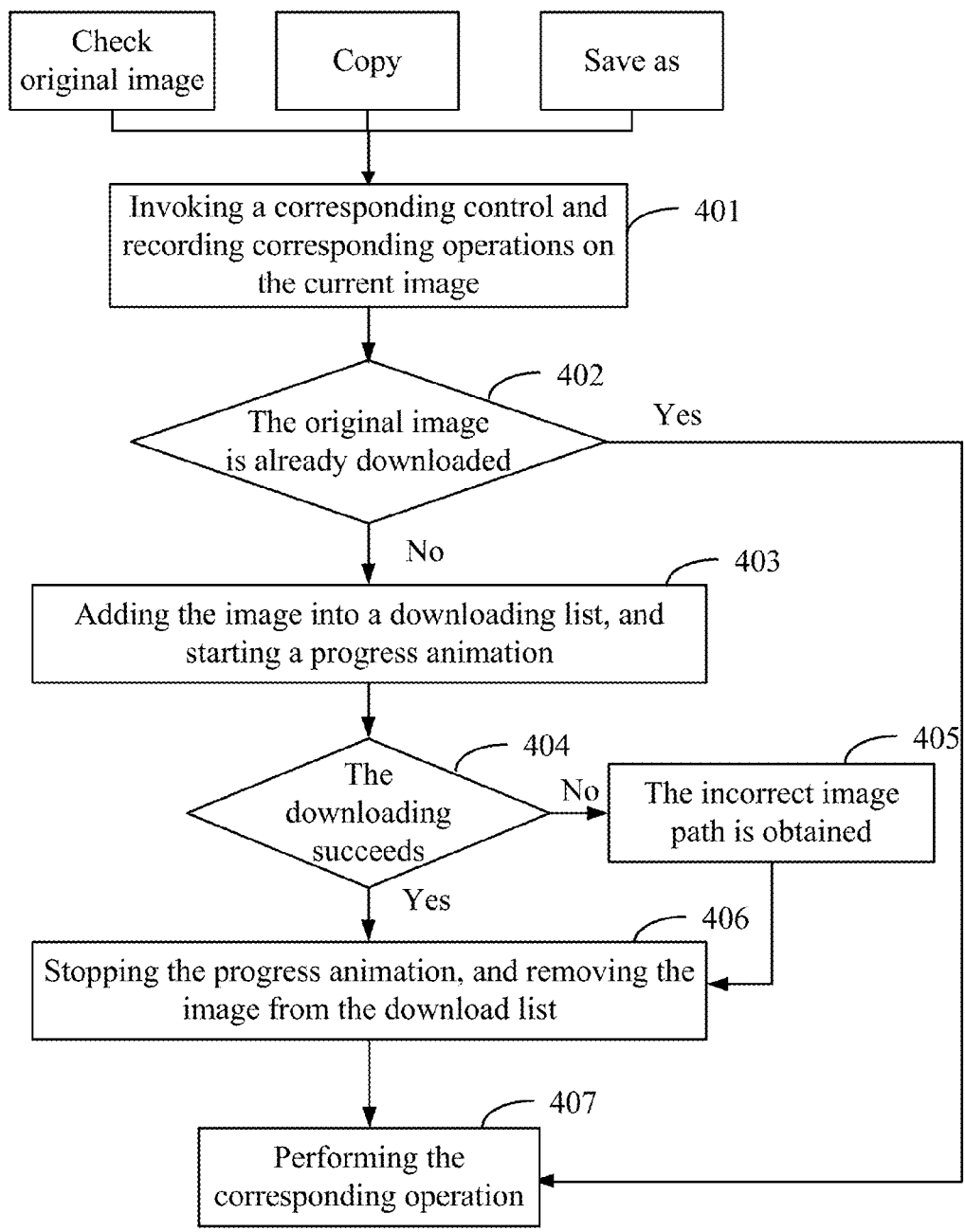
FIG. 4 is a schematic flowchart of displaying an original image according to an embodiment of the present invention.

When a user of a microblog client side performs an operation such as "Check original image", "Copy" or "Save as", a process of downloading the original image is triggered. It is assumed that a "Check original image" icon is set on the microblog page, the media type attribute in the attribute of the icon is "Image", and the media identifier is "image 1". The control corresponding to the logic processing operation of right-clicking an image is ShellExecute. As shown in FIG. 4, the process may include the following steps:

Step 401: when a user of a microblog client side right-clicks a "Check original image" icon on a page, the client side determines a need of processing an image according to the attribute of this page element, invokes a ShellExecute control according to the media type and the mouse operation type, and may further record the user's current operation on the image, for example, record the image identifier (or link, and so on) and the type of the mouse operation (right-clicking).

In this step, after invoking the ShellExecute control, the client side creates a corresponding instance, and may use a CWBlogMsgData variable to transmit a link address of the image in the logic control area of the microblog message to the instance as an input parameter of the instance.

The following operations are performed by the instance created by the ShellExecute control invoked by the client side:

Step 402: judging whether the image is already downloaded. If already downloaded, proceeding to step 407; otherwise, proceeding to step 403.

Step 403: adding the image link into a download list to download the image, whereupon a download progress animation may be started.

Step 404: judging whether the downloading succeeds. If the downloading succeeds, proceeding to step 406; otherwise, proceeding to step 405.

Step 405: locating the unsuccessfully downloaded image link in the download list, and proceeding to step 406.

Step 406: stopping displaying the download progress animation, removing the image link in the microblog message from the download list, and proceeding to step 407.

Step 408: displaying the image that is already downloaded.

In the above process, the step of judging whether the image is already downloaded is optional. This judging and the processing performed accordingly can avoid repeated downloading of the image that is already downloaded, improve processing efficiency, and save network overhead.

When a client side user performs an operation such as "Check original image", "Copy" or "Save as" repeatedly for an image, the image downloading process will be triggered repeatedly, which leads to system resource overhead. To cope with that problem, the embodiment of the present invention makes the following arrangement:

(1) The following function is added inside the control: using a map to save a list of images being downloaded; according to the image list, determining whether the operation of the client side user leads to repeated downloading of the same image; if repeated downloading occurs, screening the repeated downloading of the image, that is, rejecting the repeated downloading operation for the same image.

(2) The following function is added inside the control: using a map to save the last operation for the image, and performing only the last operation after the image is downloaded completely. For example, the user selects "Check original image" first, and then selects "Save as" immediately. In this case, a control for implementing the "Check original image" function and a control for implementing the "Save as" function are invoked consecutively. The last operation is "Save as". That is, only the control invoked according to the last operation is executed.

The above two processing processes may be used separately or combined. That is, the above two functions are added in the image processing control.

Further, for a scenario that the client side has no proper image viewer to support the image format in the microblog message, the embodiment of the present invention adds functions in the image processing control or adds a control for selecting an image viewer to display the image. Taking the addition of a control for selecting an image viewer as an example, the processing process may include the following operation:

If no image viewer corresponding to the image format is found when the invoked control works to display the image, the control returns a specific value (for example, the value returned by a ShellExecute control is less than 32). In this case, the client side may invoke a control for selecting an image viewer, and use the control to open an "Open Mode" option box, in which the user can select an image viewer, whereupon the image is displayed by the image viewer selected by the user.

Note that similar operations may be applied to rich media information of other media types. Specifically, in the process of processing the rich media information by running a rich media control, if the client side in a micro web log system does not support a rich media information format, the client side user is allowed to select a rich media information player to display the rich media information.

Embodiments of the present invention may be implemented by means of software, and the software development environment may be ATL engineering of VS2005.

As revealed in the above description, the technical solution to reusing microblog rich media messages according to embodiments of the present invention provides the user with more ways of presenting information, and enables reuse of each message page on the microblog client side by encapsulating the corresponding logics.

Figure 5:
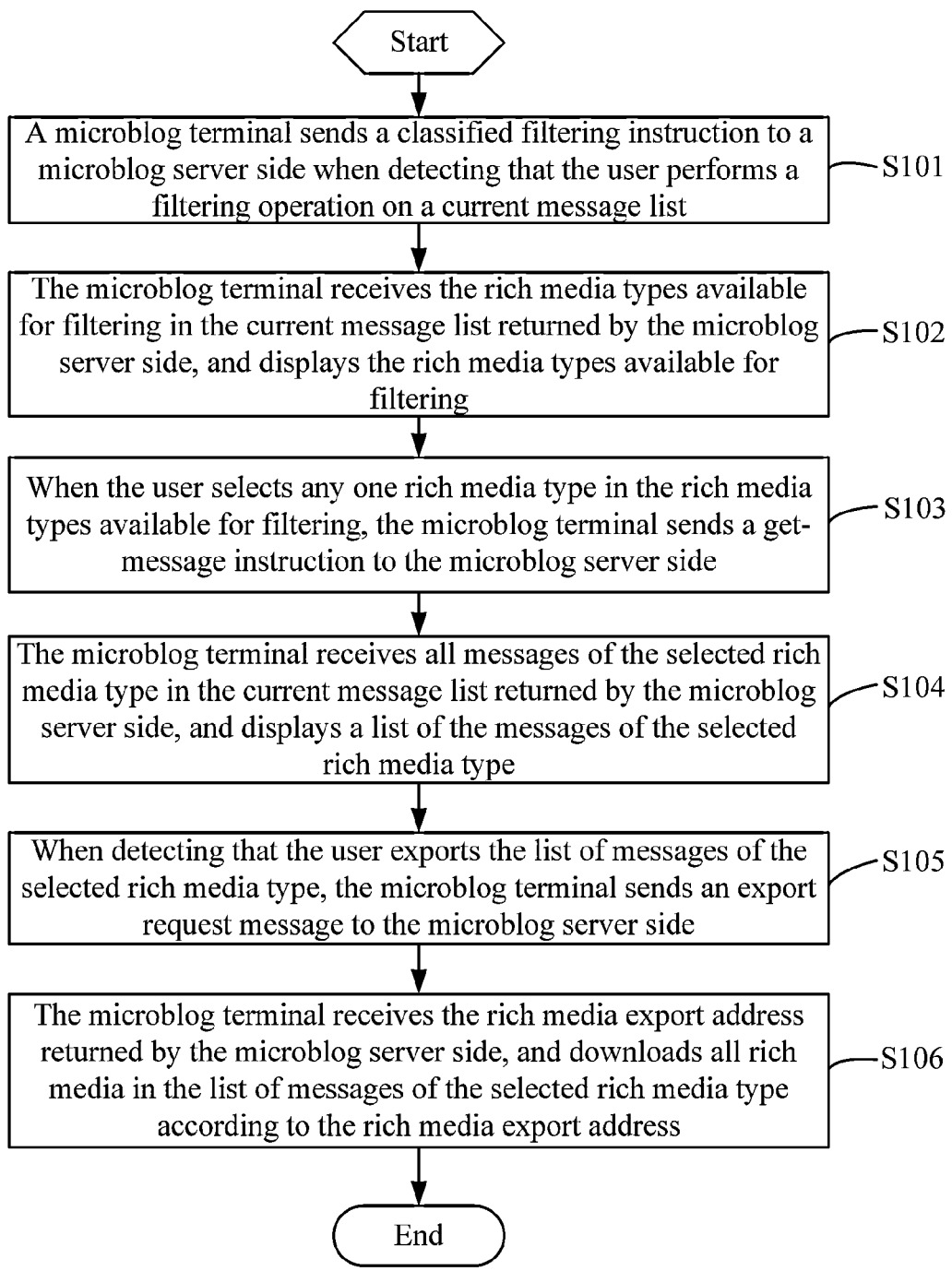
FIG. 5 is a schematic flowchart of a method for processing a microblog message in a microblog-based rich media exporting process according to an embodiment of the present invention.

As shown in FIG. 5, in a microblog-based rich media exporting process, step 202 specifically includes:

S101. a microblog terminal sends a classified filtering instruction to a microblog server side when detecting that the user performs a filtering operation on a current message list.

Figure 6:
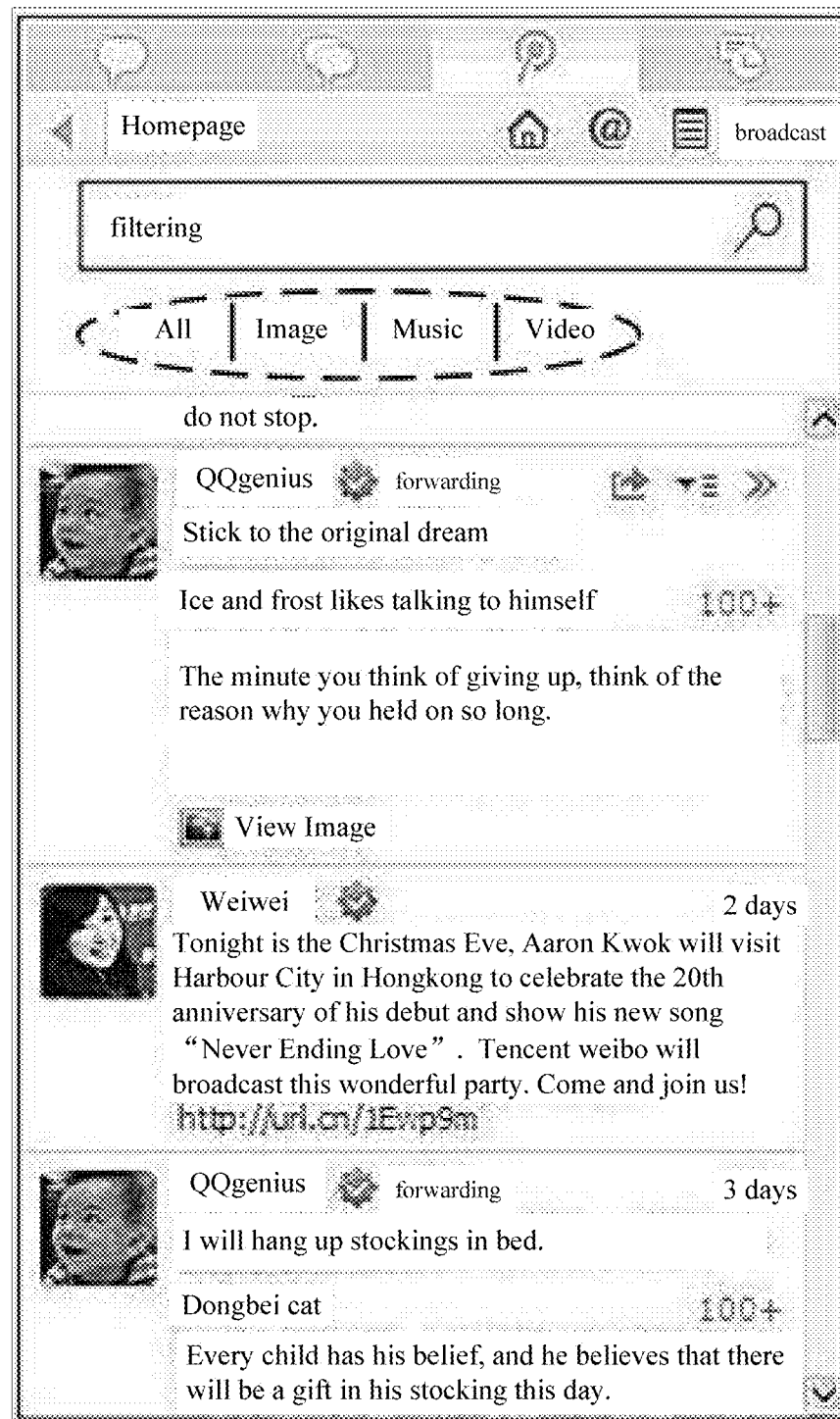
FIG. 6 is a schematic diagram of displaying a message list according to an embodiment of the present invention.

In specific practice, the user may perform a filtering operation for the current message list according to the filtering mode shown in FIG. 6; in S101, when detecting that the user performs the filtering operation for the current message list, the microblog terminal encapsulates a message index ID list of the current message list to generate a classified filtering instruction, and then sends the classified filtering instruction to the microblog server side. After receiving the classified filtering instruction, the microblog server side extracts the message body corresponding to each message index ID in the message index ID list according to the message index ID list in the classified filtering instruction, analyzes a message body corresponding to each message index ID, determines the message type of each message in the current message list, and returns rich media types available for filtering in the current message list to the microblog terminal according to all message types included in the current message list, where the message types include text type and/or rich media type, and the rich media types include at least one of image type, music type and video type.

S102. the microblog terminal receives the rich media types available for filtering in the current message list returned by the microblog server side, and displays the rich media types available for filtering.

In specific practice, in S102, the rich media types available for filtering may be displayed in a manner shown by the dashed box in FIG. 6.

S103. when the user selects any one rich media type in the rich media types available for filtering, the microblog terminal sends a get-message instruction to the microblog server side.

In specific practice, in S103, when detecting that the user selects any one rich media type in the rich media types available for filtering, the microblog terminal encapsulates the message index ID list of the current message list together with the identifier of the selected rich media type to generate a get-message instruction, and sends the get-message instruction to the microblog server side. After receiving the get-message instruction, the microblog server side extracts the message body corresponding to each message index ID in the message index ID list according to the message index ID list in the get-message instruction, queries the message body that includes the identifier among the extracted message bodies according to the identifier of the rich media type selected in the get-message instruction, and updates the message index ID list in the get-message instruction according to the queried message body; and then returns the updated message index ID list together with the queried message body to the microblog terminal.

S104. the microblog terminal receives all messages of the selected rich media type in the current message list returned by the microblog server side, and displays a list of the messages of the selected rich media type.

In S104, the microblog terminal receives the messages of the rich media type returned by the microblog server side (the messages include an updated message index ID list and message bodies), parses the message bodies, and, in a one-to-one relationship, matches each message body with the updated index ID list in the received messages; uses an Item control of each message to generate a list of messages of the rich media type, and displays the list of the messages of the rich media type.

S105. when detecting that the user exports the list of messages of the selected rich media type, the microblog terminal sends an export request message to the microblog server side.

In specific practice, in S105, when detecting that the user exports the list of messages of the selected rich media type, the microblog terminal encapsulates the message index ID list corresponding to the list of messages of the rich media type to generate an export request message, and sends the export request message to the microblog server side. After receiving the export request message sent by the microblog terminal, the microblog server side extracts a message body corresponding to each message index ID in the message index ID list according to the message index ID list in the export request message, parses a rich media URL address included in the extracted message body, processes the URL address to obtain a rich media export address, and then returns the rich media export address to the microblog terminal, where the rich media includes at least one of images, music and videos.

For different rich media types, the processing of the microblog server side varies. If the user selects the image type as the rich media type, because all images in a microblog message are stored in an image server on the microblog server side, the microblog server side obtains image URL addresses through parsing, downloads all images corresponding to the image URL addresses from the image server according to the image URL addresses obtained through parsing, and compresses and encapsulates all images to generate an image export package. The microblog server side stores the image export package, uses a storage address of the image export package as an image export address, and returns the image export address to the microblog terminal. If the user selects music or video type as the rich media type, because the music or video in a microblog message is not actually stored, after obtaining the music URL address or video URL address through parsing, the microblog server side directly compresses and encapsulates the music URL address or video URL address obtained through parsing to obtain a music export address or a video export address, and then returns the music export address or video export address to the microblog terminal.

S106. the microblog terminal receives the rich media export address returned by the microblog server side, and downloads all rich media in the list of messages of the selected rich media type according to the rich media export address.

As mentioned above, for different types of rich media, the processing mode of the microblog server side varies. Therefore, in this step, the microblog terminal downloads the image export package according to the image export address if receiving the image export address returned by the microblog server side. If the microblog terminal receives the music export address or video export address returned by the microblog server side, the microblog terminal downloads music or videos from the corresponding website according to all URL addresses in the music export address or video export address.

In the embodiment of the present invention, through only simple operations of the user, the messages of rich media types in the message list can be filtered, displayed in a list form, and exported in a package. Therefore, the microblog functions are more diversified, the rich media information in a microblog message is made full use of, and the user can use the microblog more conveniently.

Figure 7A:
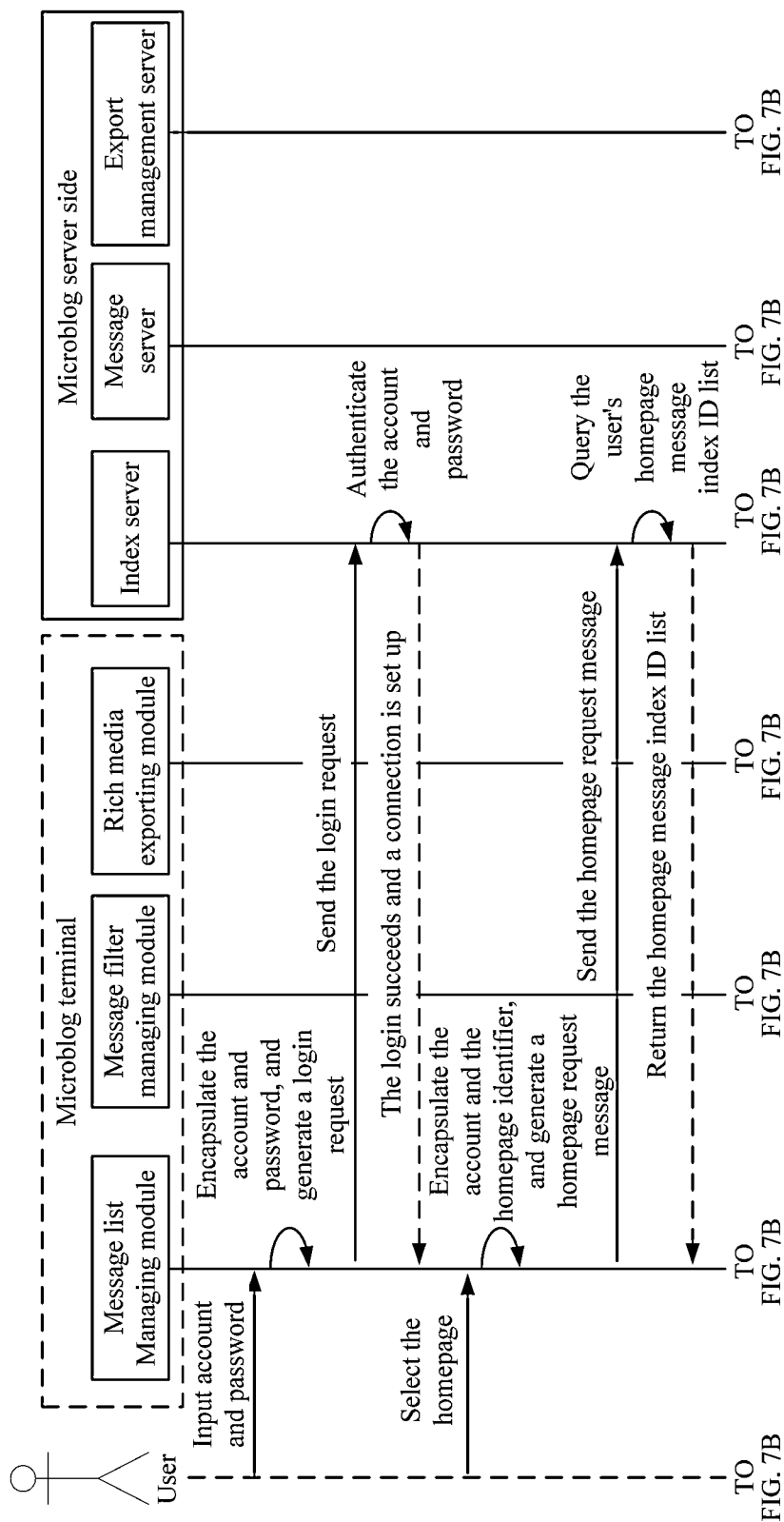
FIG. 7A-FIG. 7C are another schematic flowchart of a method for processing a microblog message in a microblog-based rich media exporting process according to an embodiment of the present invention.
Figure 7B:
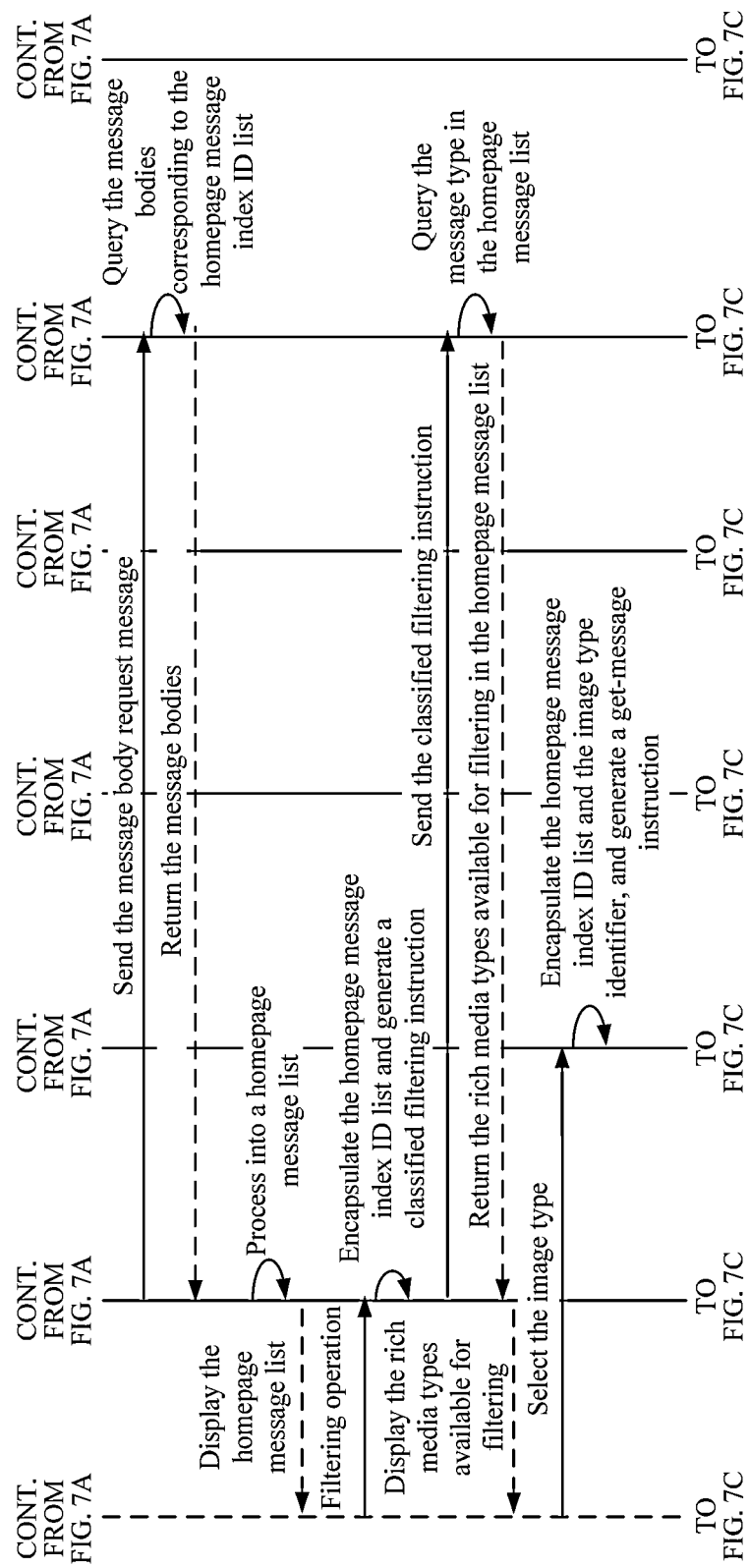
Figure 7C:
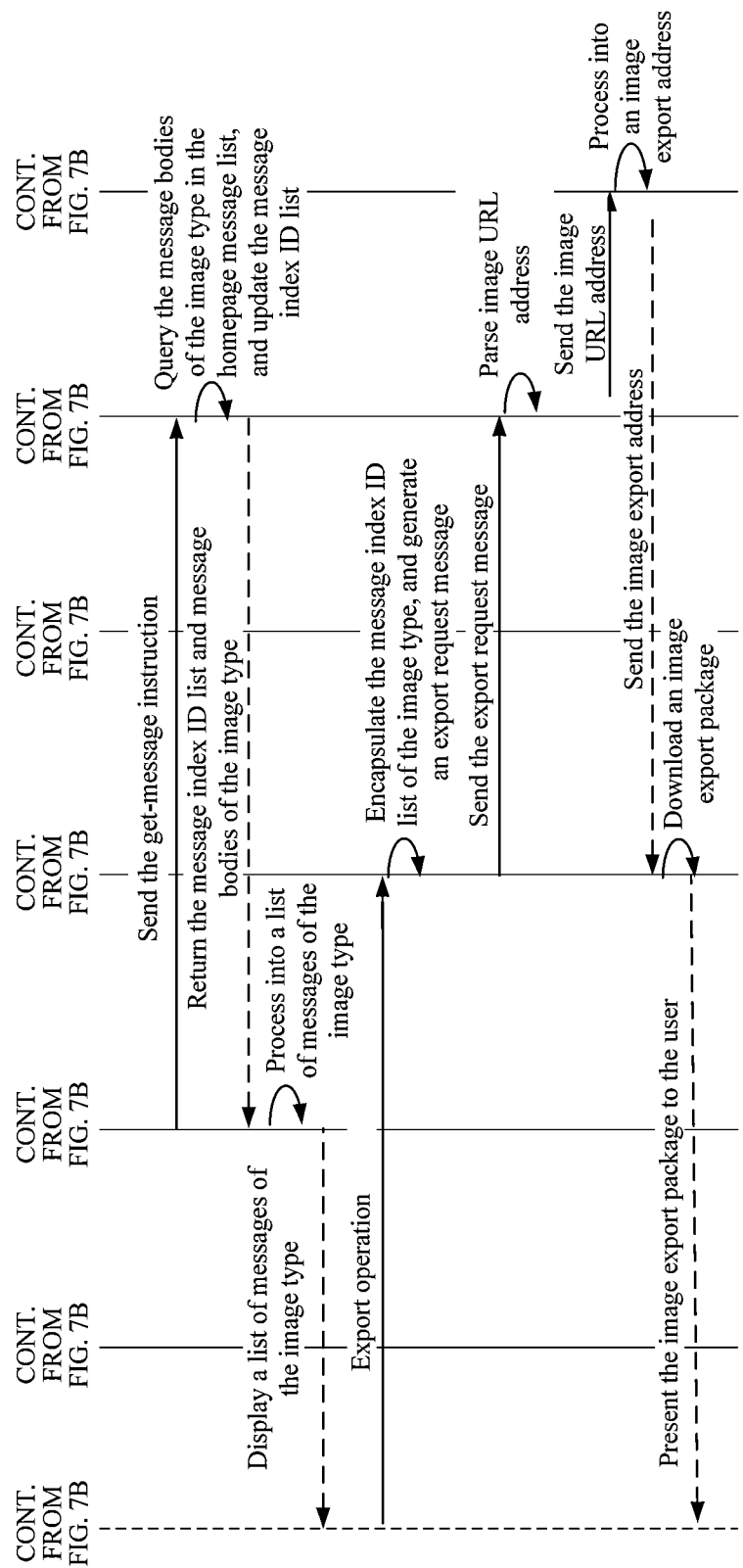

As shown in FIG. 7A-FIG. 7C, the embodiment of the present invention uses a specific instance to describe the process of implementing step 202 in the microblog-based rich media exporting.

The user inputs a registered user account and a password in an IM client side of the microblog terminal. The microblog terminal assembles the user account and the password and sends a login request to the microblog server side. The login server on the microblog server side authenticates the user account and password. After the authentication succeeds, a connection path is set up between the microblog terminal and the microblog server side. The microblog terminal sends heartbeat packets to the microblog server side regularly to ensure the connection to the microblog server side. The microblog terminal may display message lists such as the user's microblog homepage, hot broadcast, broadcast hall, or city broadcast.

When the user chooses to view his/her microblog homepage, a message list managing module of the microblog terminal encapsulates the user account and a homepage identifier to generate a homepage request message, and sends the homepage request message to an index server on the microblog server side. After receiving the homepage request message, the index server queries accounts of all audience of the user according to the user account, uses the queried audience accounts to obtain message index IDs published by the audience, arranges the message index IDs chronologically to generate a message index ID list, and returns the list to the message list managing module of the microblog terminal. The message list managing module of the microblog terminal encapsulates the received message index ID list to generate a message body request message, and sends the message body request message to a message server on the microblog server side. After receiving the message index ID list, the message server queries the corresponding message bodies according to the message index ID list, and returns each packet of the queried message bodies to the message list managing module respectively. The message list managing module parses the received message bodies, matches each message body with the message index ID list in a one-to-one relationship, and uses an Item control of each message to generate a homepage message list and presents it to the user.

When the user inputs a "filter" keyword in a search bar, the message list managing module encapsulates the message index ID list of the homepage message list into a classified filtering instruction, and sends the classified filtering instruction to the message server. According to the message index ID list in the classified filtering instruction, the message server extracts the message body corresponding to each message index ID in the message index ID list, analyzes the message body corresponding to each message index ID, determines a message type of each message in the homepage message list, and then returns rich media types available for filtering in the homepage message list to the message list managing module. The message list managing module presents the received rich media types available for filtering in the homepage message list to the user.

When the user selects an image type, the message filter managing module encapsulates the message index ID list of the homepage message list together with an identifier of the image type to generate a get-message instruction, and sends the instruction to the message server. According to the message index ID list in the get-message instruction, the message server extracts the message body corresponding to each message index ID in the message index ID list; according to the identifier of the image type in the get-message instruction, the message server queries the message body including the identifier in the extracted message bodies, and uses the queried message body to update the message index ID list in the get-message instruction. Specifically, the process of updating the message index ID list is: the message server parses the queried message bodies, extracts the corresponding message index IDs from the received message index ID list, and processes all extracted message index IDs into a new message index ID list chronologically. The message server returns the updated message index ID list together with the queried message bodies to the message filter managing module; and the message filter managing module parses the received message bodies and the new message index ID list, matches the two in a one-to-one relationship, uses an Item control of each message to generate a list of messages of the image type, and presents the list to the user.

The user confirms the operation of exporting images, and the rich media exporting module encapsulates the message index ID list of the message list of the image type to generate an export request message, and sends the export request message to the message server. According to the message index ID list in the export request message, the message server extracts a message body corresponding to each message index ID in the message index ID list, parses an image URL address included in each extracted message body, and sends the image URL address to an export management server. Because all images in the microblog message are stored in an image server on the microblog server side, the export management server downloads all images corresponding to the image URL addresses from the image server according to the received image URL addresses, compresses and encapsulates all images to generate an image export package, stores the image export package, and sends the storage address of the image export package as an image export address to the rich media exporting module. The rich media exporting module downloads the image export package according to the received image export address, and presents the downloaded image export package to the user.

Note that, if the user selects music or video and confirms the operation of exporting, because the music or video in a microblog message is not actually stored, after receiving the music URL address or video URL address sent by the message server, the export management server directly compresses and encapsulates the music URL address or video URL address obtained through parsing to obtain a music export address or a video export address, and then sends the music export address or video export address to the rich media exporting module. The rich media exporting module downloads music or videos from the corresponding website according to all URL addresses in the received music export addresses or video export addresses, and presents the downloaded music or videos to the user.

As revealed in the above description about the embodiment of the present invention, the embodiment of the present invention displays the current message list to the user, presents the types available for filtering to the user when the user performs a filtering operation for the current message list, and presents the messages of all rich media types in the current message list to the user in a list form when the user selects rich media types in the types available for filtering; provides an export interface for the user, and, when it is detected that the user uses the export interface to export the list of messages of the rich media types, encapsulates all rich media information included in the list of messages of rich media types, exports the rich media information, and presents it to the user. In the embodiment of the present invention, through only simple operations of the user, the messages of rich media types in the message list can be filtered, displayed in a list form, and exported in a package. Therefore, the microblog functions are more diversified, the rich media information in the microblog information is made full use of, and the user can use the microblog more conveniently.

Based on the same technical conception, an embodiment of the present invention provides an apparatus for processing micro web log messages. The apparatus may be located on a client side in a micro web log system.

Figure 8:
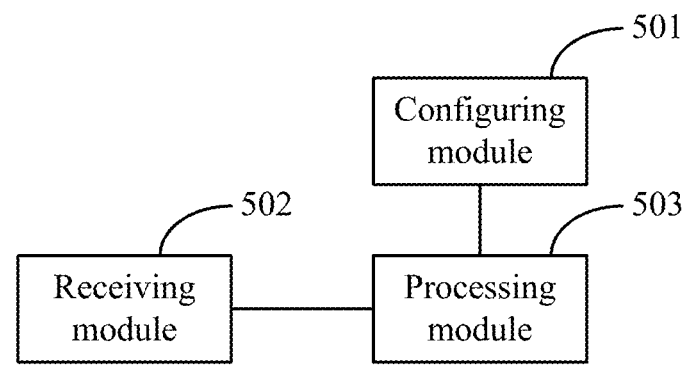
FIG. 8 is a schematic structural diagram of an apparatus for processing micro web log messages according to an embodiment of the present invention.

As shown in FIG. 8, the apparatus may include:

a configuring module 501, configured to configure a unified rich media control, where the rich media control is obtained by encapsulating rich media information processing logics according to an operation type and a media type of rich media information;

a receiving module 502, configured to receive an operation request for processing rich media information in a micro web log message; and a processing module 503, configured to invoke a corresponding rich media control according to the operation type and the media type of the requested rich media information, and run the control to process the rich media information properly.

In the apparatus above, the receiving module 502 can receive the operation request for loading rich media information. Correspondingly, by invoking a rich media control, the processing module 503 can load the corresponding media information according to one or any combination of the following configuration information items:

a display priority level set for a media type;

a display/hide attribute set for the media type; and quantity of displayed rich media information set for the media type.

The configuration information is bound to an installation program or an update program of each version of the client side in the micro web log system respectively; correspondingly, the configuring module 501 may set the configuration information into a micro web log client side in the process of installing or updating the micro web log client side.

In the apparatus above, the receiving module 502 may receive a request for operating a page element from a client side user of the micro web log system; correspondingly, the processing module 503 may determine the media type of media information according to the page element operated by the user, invoke a corresponding rich media control according to the media type and the user's operation type, use attribute parameters of the media information corresponding to the page element as input parameters of the control, and run the control to process the media information corresponding to the page element properly.

In the apparatus above, in the process of running the rich media control to process the rich media information, the processing module 503 may reject the operation of downloading the rich media information repeatedly in the case of downloading the same rich media information repeatedly.

In the apparatus above, in the process of running the rich media control to process the rich media information, the processing module 503 may execute only the last invoked rich media control in the case that different rich media controls are invoked for the same rich media information consecutively.

In the apparatus above, in the process of running the rich media control to process the rich media information, if the client side in a micro web log system does not support a rich media information format, the processing module 503 may allow the client side user to select a rich media information player to display the rich media information.

As revealed in the above description about the embodiment of the present invention, those skilled in the art clearly understand that the embodiments of the present invention may be implemented by means of hardware only, or, preferably in most circumstances, by means of software and a necessary universal hardware platform. Based on such understanding, the essence of, or the contribution made by, the technical solution of the present invention may be embodied in a software product. The computer software product is stored in a storage medium, and includes several instructions that enable a terminal device (such as mobile phone, personal computer, server, or network device) to execute the method disclosed in any embodiment of the present invention.

Figure 9:
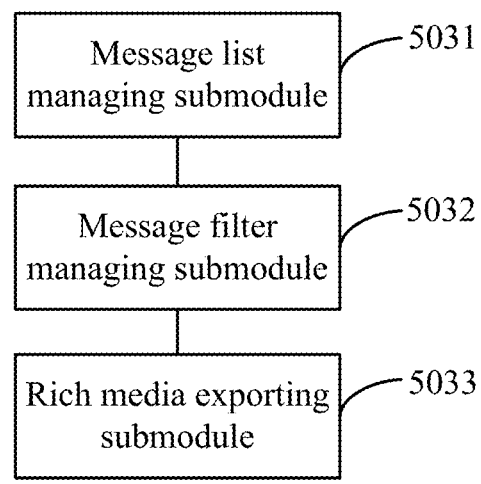
FIG. 9 is a schematic structural diagram of a processing module applied in a microblog-based rich media exporting process according to an embodiment of the present invention.

As shown in FIG. 9, in a microblog-based rich media exporting process, the processing module 503 specifically includes a message list managing submodule 5031, a message filter managing submodule 5032, and a rich media exporting submodule 5033.

The message list managing submodule 5031 is configured to display a current message list, send a classified filtering instruction to the microblog server side when detecting that the user performs a filtering operation for the current message list, receive rich media types available for filtering in the current message list returned by the microblog server side, and display the rich media types available for filtering.

In specific practice, the user uses a registered user account and a password on an IM client side of the microblog terminal to log in to the microblog server side for authentication; if the user account and the password are authenticated successfully, a connection path is set up between the microblog terminal and the microblog server side. The microblog terminal accesses the microblog server side through an access server, and the microblog terminal sends heartbeat packets to the microblog server side regularly to ensure the connection to the microblog server side. The microblog terminal may display message lists such as the user's microblog homepage, hot broadcast, broadcast hall, or city broadcast. The message list managing submodule 5031 is configured to display the current message list according to display contents selected by the user. For example, if the user chooses to view his/her microblog homepage, the message list managing submodule 5031 encapsulates the user account and a homepage identifier to generate a homepage request message, and sends the homepage request message to the microblog server side. After receiving the homepage request message, the microblog server side queries accounts of all audience of the user according to the user account, uses the queried audience accounts to obtain message index IDs published by the audience, arranges the message index IDs chronologically to generate a message index ID list, and returns the list to the message list managing submodule 5031. After receiving the message index ID list, the message list managing submodule 5031 encapsulates the message index ID list to generate a message body request message, and sends the message body request message to the microblog server side. After receiving the index ID list, the microblog server side queries the corresponding message bodies according to the message index ID list, and returns each packet of the queried message bodies to the message list managing submodule 5031 respectively. The message list managing submodule 5031 parses the message bodies, matches each message body with the received message index ID list in a one-to-one relationship, uses an Item control of each message to generate a homepage message list, and presents the homepage message list to the user.

In the embodiment of the present invention, the microblog terminal provides a search bar for the user. In the search bar, the user can perform a filtering operation for the current message list. FIG. 6 is a schematic diagram of displaying a message list on the microblog terminal according to the embodiment of the present invention. As shown in FIG. 6, by inputting a "filter" keyword in the search bar provided by the microblog terminal, the user implements the filtering operation for the current message list. The message list managing submodule 5031 sends a classified filtering instruction to the microblog server side when detecting the user's filtering operation, receives rich media types available for filtering in the current message list from the microblog server side, and presents the rich media types available for filtering to the user, where the rich media types include but are not limited to at least one of image type, music type and video type. The part indicated by the dashed box in FIG. 6 shows the rich media types available for filtering in the current message list displayed by the message list managing submodule 5031. Note that the rich media types available for filtering are rich media types included in the current message list. As mentioned above, the current message list is a homepage message list. If the homepage message list includes messages of the image type, messages of the music type, and messages of the video type, the rich media types available for filtering in the homepage message list include the image type, music type and video type.

Understandably, microblog messages include both text messages and rich media messages, and both may be originally created or forwarded by the user. Therefore, the message list managing submodule 5031 can also display the text type during the classified display of the rich media types available for filtering; or display an original creation attribute or a forwarding attribute during the classified display of the rich media types available for filtering. Such scenarios can be analyzed by analogy, and are not detailed here any further. Besides, the search bar provided by the microblog terminal provides a shortcut for the user's filtering operation. The shortcut makes use of the search bar functions of existing microblog terminals, and is similar to the existing search process. However, this mode is only an example. There may be other scenarios. For example, the microblog terminal may add a filter shortcut key on the interface, and the user clicks the filter shortcut key to perform a filtering operation for the current message list; or, the microblog terminal may provide the user with a menu that includes a filter shortcut, and the user uses the filter shortcut to perform the filtering operation for the current message list, and so on. Such other scenarios may be analyzed by analogy, and are not detailed here any further.

The message filter managing submodule 5032 is configured to send a get-message instruction to the microblog server side when the user selects any one rich media type among the rich media types available for filtering that are displayed by the message list managing submodule 5031, receive all messages of the selected rich media type in the current message list returned by the microblog server side, and display a list of the messages of the selected rich media type.

In specific practice, according to the example given above, the message list managing submodule 5031 displays the rich media types available for filtering in the homepage message list indicated by the dashed box in FIG. 6, and the user may select any one rich media type among them. The message filter managing submodule 5032 detects which rich media type is selected by the user. If detecting that the user selects an image type, the message filter managing submodule 5032 sends a get-message instruction to the microblog server side, receives all messages of the image type in the homepage message list from the microblog server side, and displays a list of the messages of the image type.

The rich media exporting submodule 5033 is configured to: when it is detected that the user performs an export operation for the list of messages of the selected rich media type, where the list of messages is displayed by the message filter managing submodule 5032, send an export request message to the microblog server side, receive a rich media export address returned by the microblog server side, and download rich media in the list of messages of the selected rich media type according to the rich media export address.

In specific practice, the microblog terminal provides the user with an export interface. The export interface may be an export button or an export menu. By clicking the export button or an export item in the export menu, the user can export the currently displayed list of messages of the selected rich media type. According to the example above, the message filter managing submodule 5032 displays a list of messages of the selected image type. If detecting that the user performs an export operation for the list of messages of the selected image type, the rich media exporting submodule 5033 sends an export request message to the microblog server side, receives an image export address returned by the microblog server side, and downloads an image export package according to the image export address. The downloaded image export package is stored in a specified location on the microblog terminal. Upon completion of the downloading, the rich media exporting submodule 5033 may prompt the user to view the downloaded package, or the user may proactively view, edit, process, and so on, the image export package in the specified location on the microblog terminal.

In the embodiment of the present invention, through only simple operations performed by the user on the microblog terminal, the messages of rich media types in the message list can be filtered, displayed in a list form, and exported in a package. Therefore, the microblog functions are more diversified, the rich media information in a microblog message is made full use of, and the user can use the microblog more conveniently.

To describe the technical solution of the present invention more clearly, the following gives details about each module in the microblog terminal in the embodiments of the present invention.

Figure 10:
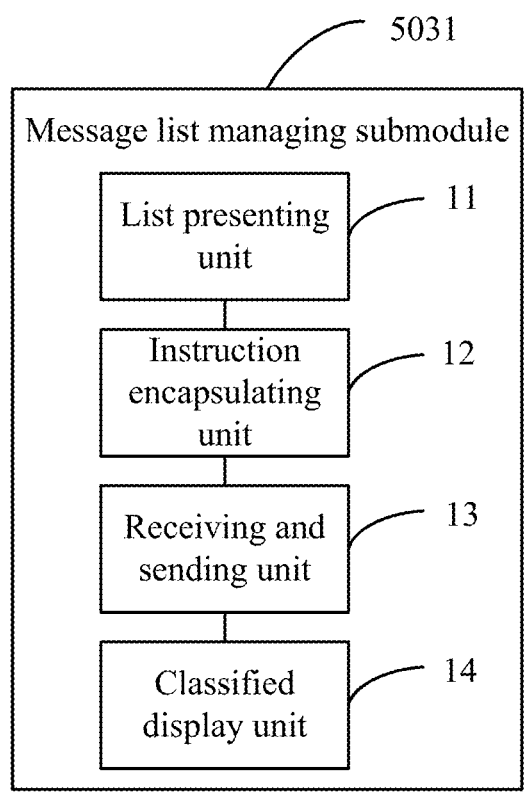
FIG. 10 is a schematic structural diagram of a message list managing submodule according to an embodiment of the present invention.

FIG. 10 is a schematic structural diagram of a message list managing submodule of a microblog terminal according to an embodiment of the present invention. The message list managing submodule 5031 includes a list presenting unit 11, an instruction encapsulating unit 12, a receiving and sending unit 13, and a classified display unit 14.

The list presenting unit 11 is configured to present a current message list.

In specific practice, the microblog terminal may display a message list such as the user's microblog homepage, hot broadcast, broadcast hall, or city broadcast. The list presenting unit 11 is configured to display the current message list according to display contents selected by the user. For example, if the user chooses to view the microblog homepage, the list presenting unit 11 presents a homepage message list of the user to the user.

The instruction encapsulating unit 12 is configured to encapsulate a message index ID list of the current message list to generate a classified filtering instruction when it is detected that the user performs a filtering operation for the current message list presented by the list presenting unit 11.

As mentioned above, in the way shown in FIG. 6, the user performs an filtering operation for the homepage message list presented by the list presenting unit 11. When detecting the filtering operation of the user, the instruction encapsulating unit 12 encapsulates a message index ID list of the homepage message list to generate a classified filtering instruction. The encapsulation process of the instruction encapsulating unit 12 is similar to a message encapsulation process in the prior art, and is not detailed here any further.

The receiving and sending unit 13 is configured to send the classified filtering instruction generated by the instruction encapsulating unit 12 to the microblog server side, and receive rich media types available for filtering in the current message list returned by the microblog server side.

The classified display unit 14 is configured to display the rich media types available for filtering that are received by the receiving and sending unit 13. In specific practice, the rich media types available for filtering are rich media types included in the current message list. As mentioned above, the current message list is a homepage message list. If the homepage message list includes messages of the image type, messages of the music type, and messages of the video type, the rich media types available for filtering in the homepage message list include the image type, music type and video type.

The following gives a detailed description about working principle of each unit in the message list managing submodule 5031.

As mentioned above, if the list presenting unit 11 confirms that the user chooses to view a microblog homepage, the instruction encapsulating unit 12 encapsulates a user account and a homepage identifier to generate a homepage request message, whereupon the homepage request message is sent by the receiving and sending unit 13 to the microblog server side. After receiving the homepage request message, the microblog server side queries accounts of all audience of the user according to the user account, uses the queried audience accounts to obtain message index IDs published by the audience, arranges the message index IDs chronologically to generate a message index ID list, and returns the list to the receiving and sending unit 13. The instruction encapsulating unit 12 encapsulates the received message index ID list to generate a message body request message, whereupon the message body request message is sent by the receiving and sending unit 13 to the microblog server side. After receiving the index ID list, the microblog server side queries the corresponding message bodies according to the message index ID list, and returns each packet of the queried message bodies to the receiving and sending unit 13 respectively. The list presenting unit 11 parses the received message bodies, matches each message body with the received message index ID list in a one-to-one relationship, and uses an Item control of each message to generate a homepage message list and presents the list to the user.

In the way shown in FIG. 6, the user performs a filtering operation for the homepage message list presented by the list presenting unit 11. The instruction encapsulating unit 12 encapsulates the message index ID list of the homepage message list into a classified filtering instruction, whereupon the classified filtering instruction is sent by the receiving and sending unit 13 to the microblog server side. According to the message index ID list in the classified filtering instruction, the microblog server side extracts the message body corresponding to each message index ID in the message index ID list, analyzes the message body corresponding to each message index ID, determines a message type of each message in the homepage message list, and then returns rich media types available for filtering in the homepage message list to the receiving and sending unit 13. The classified display unit 14 presents the rich media types available for filtering in the current homepage message list to the user, where the rich media types are received by the receiving and sending unit 13.

In the embodiment of the present invention, through only simple operations performed by the user on the microblog terminal, the messages of rich media types in the message list can be filtered. Therefore, the microblog functions are more diversified, the rich media information in a microblog message is made full use of, and the user can use the microblog more conveniently.

Figure 11:
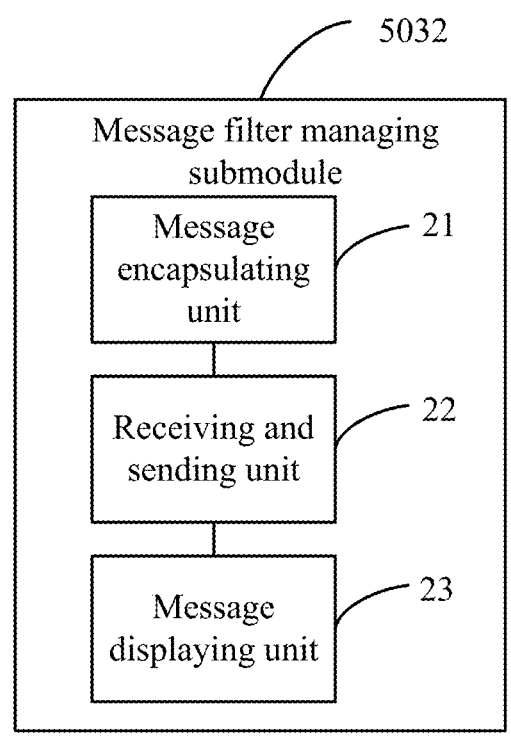
FIG. 11 is a schematic structural diagram of a message filtering submodule according to an embodiment of the present invention.

FIG. 11 is a schematic structural diagram of a message filter managing submodule of a microblog terminal according to an embodiment of the present invention. The message filter managing submodule 5032 includes a message encapsulating unit 21, a receiving and sending unit 22, and a message displaying unit 23.

The message encapsulating unit 21 is configured to: when detecting that a user selects any one rich media type in rich media types available for filtering, where the rich media types are displayed by the message list managing submodule 5031, encapsulate a message index ID list of the current message list together with an identifier of the selected rich media type to generate a get-message instruction.

The receiving and sending unit 22 is configured to send the get-message instruction generated by the message encapsulating unit 21 to the microblog server side, and receive a message index ID list and message bodies of all messages of the selected rich media type in the current message list returned by the microblog server side.

The message displaying unit 23 is configured to: according to the message index ID list and the message bodies of the messages of the selected rich media type, where the list and the message bodies are received by the receiving and sending unit 22, create a list of messages of the selected rich media type, and display the list of the messages of the selected rich media type.

The following gives a detailed description about working principle of each unit in the message filter managing submodule 5032.

According to the example given above, after the user selects an image type in the rich media types available for filtering in FIG. 6, the message encapsulating unit 21 encapsulates the message index ID list of the homepage message list together with an identifier of the image type to generate a get-message instruction, whereupon the instruction is sent by the receiving and sending unit 22 to the microblog server side. According to the message index ID list in the get-message instruction, the microblog server side extracts the message body corresponding to each message index ID in the message index ID list; according to the identifier of the image type in the get-message instruction, the microblog server side queries the message bodies including the identifier in the extracted message bodies, and uses the queried message bodies to update the message index ID list in the get-message instruction. Specifically, the process of updating the message index ID list is: the server side parses the queried message bodies, extracts the corresponding message index IDs from the received message index ID list, and processes all extracted message index IDs into a new message index ID list chronologically. The server side returns the updated message index ID list together with the queried message bodies to the receiving and sending unit 22; and the message displaying unit 23 parses the received message bodies and the updated message index ID list, matches the two in a one-to-one relationship, uses an Item control of each message to generate a list of messages of the image type, and presents the list to the user.

In the embodiment of the present invention, through only simple operations performed by the user on the microblog terminal, the messages of rich media types in the message list can be displayed in a list form. Therefore, the microblog functions are more diversified, the rich media information in a microblog message is made full use of, and the user can use the microblog more conveniently.

Figure 12:
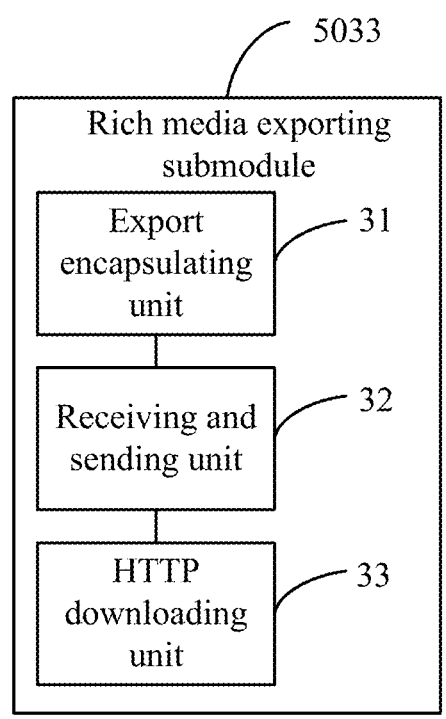
FIG. 12 is a schematic structural diagram of a rich media exporting submodule according to an embodiment of the present invention.

FIG. 12 is a schematic structural diagram of a rich media exporting submodule of a microblog terminal according to an embodiment of the present invention. The rich media exporting submodule 5033 includes:

an export encapsulating unit 31, configured to: when detecting that a user performs an export operation for a list of messages of the selected rich media type, where the list is presented by the message filter managing submodule 5032, encapsulate a message index ID list corresponding to the list of messages of the selected rich media type to generate an export request message;

a receiving and sending unit 32, configured to send the export request message generated by the export encapsulating unit 31 to the microblog server side, and receive a rich media export address returned by the microblog server side; and an HTTP downloading unit 33, configured to download all rich media in the list of messages of the selected rich media type according to the rich media export address received by the receiving and sending unit 32.

The following gives a detailed description about working principle of each unit in the rich media exporting submodule 5033.

According to the example above, when the user uses an export interface provided by the microblog terminal to perform an export operation on the list of messages of the image type in the homepage message list, the export encapsulating unit 31 encapsulates the message index ID list of the message list of the image type to generate an export request message, whereupon the export request message is sent by the receiving and sending unit 32 to the microblog server side. According to the message index ID list in the export request message, the microblog server side extracts a message body corresponding to each message index ID in the message index ID list, and parses image URL addresses included in the extracted message bodies. Because all images in a microblog message are stored in an image server on the microblog server side, the microblog server side downloads all images corresponding to the image URL addresses from the image server according to the image URL addresses obtained through parsing, compresses and encapsulates all the images to generate an image export package, stores the image export package, and sends a storage address of the image export package as an image export address to the receiving and sending unit 32. The HTTP downloading unit 33 downloads the image export package according to the image export address received by the receiving and sending unit 32.

Note that, if the user selects music or video as a rich media type, because the music or video in a microblog message is not actually stored, the microblog server side directly compresses and encapsulates the music URL address or video URL address obtained through parsing to obtain a music export address or a video export address after obtaining the music URL address or video URL address through parsing, and then sends the music export address or video export address to the receiving and sending unit 32. The HTTP downloading unit 33 downloads music or videos from the corresponding website according to all URL addresses in the music export addresses or video export addresses received by the receiving and sending unit 32.

Understandably, the HTTP downloading mode in the embodiment of the present invention is only an example. Instead, an FTP (File Transfer Protocol, File Transfer Protocol) mode or other download tools may be used. In such cases, the analysis is similar and is not detailed here any further.

In the embodiment of the present invention, through only simple operations performed by the user on the microblog terminal, the messages of rich media types in the message list can be exported in a package. Therefore, the microblog functions are more diversified, the rich media information in a microblog message is made full use of, and the user can use the microblog more conveniently.

The above descriptions are merely preferred embodiments of the present invention, and it should be noted that persons having ordinary skill in the art may make various improvements and refinements without departing from the principle of the present invention. Such improvements and refinements shall fall within the protection scope of the present invention.

What is claimed is:

1. A method for processing micro web log messages, wherein: a rich media control is configured in each client side in a micro web log system, wherein the rich media control is obtained by encapsulating rich media information processing logics according to an operation type and a media type of rich media information, and the method comprises:

receiving, by the client side in the micro web log system, an operation request for processing rich media information in a micro web log message; and invoking, by the client side in the micro web log system, a corresponding rich media control according to the operation type and the media type of the requested rich media information, and running the corresponding rich media control to process the rich media information, wherein the micro web log message is unable to be edited by invoking and running the corresponding rich media control;

wherein: when the operation type of the rich media information is an operation of loading rich media information, the corresponding rich media control loads corresponding media information according to one of or any combination of the following configuration information items:

a display priority level set for a media type;

a display/hide attribute set for the media type; and quantity of displayed rich media information set for the media type;

wherein: the invoking, by the client side in the micro web log system, the corresponding rich media control according to the operation type and the media type of the requested rich media information, and running the corresponding rich media control to process the rich media information comprises:

sending, by a microblog terminal, a classified filtering instruction to a microblog server side when detecting that a user performs a filtering operation on a current message list, receiving rich media types available for filtering in the current message list returned by the microblog server side, and displaying the rich media types available for filtering;

sending, by the microblog terminal, a get-message instruction to the microblog server side when the user selects any one rich media type among the rich media types available for filtering, receiving all messages of the selected rich media type in the current message list returned by the microblog server side, and displaying a list of the messages of the selected rich media type; and sending, by the microblog terminal, an export request message to the microblog server side when it is detected that the user performs an export operation on the list of the messages of the selected rich media type, receiving a rich media export address returned by the microblog server side, and downloading all rich media in the list of the messages of the selected rich media type according to the rich media export address.

2. The method according to claim 1, wherein the encapsulating the rich media information processing logics according to the operation type and the media type of the rich media information to obtain the rich media control comprises:

for each operation type, encapsulating the processing logics of each different type of rich media information into a corresponding rich media control respectively, depending on the media type.

3. The method according to claim 2, wherein: the configuration information is bound to an installation program or an update program of each version of a client side in the micro web log system respectively; and the configuration information is set into a micro web log client side in a process of installing or updating the micro web log client.

4. The method according to claim 1, wherein:

the operation type of the rich media information is: a client side user of the micro web log system operates a page element;

the invoking, by the client side in the micro web log system, a corresponding rich media control according to the operation type and the media type of the requested rich media information, and running the corresponding rich media control to process the rich media information comprises:

determining, by the client side of the micro web log system, a media type of rich media information corresponding to the page element according to the page element operated by the user, invoking a corresponding rich media control according to the media type and the user's operation type, using attribute parameters of the rich media information corresponding to the page element as input parameters of the corresponding rich media control, and running the corresponding rich media control to process the rich media information corresponding to the page element.

5. The method according to claim 1, wherein: in a process of running the corresponding rich media control to process the rich media information, the operation of downloading the rich media information repeatedly is rejected in a case of downloading the same rich media information repeatedly.

6. The method according to claim 1, wherein: in a process of running the corresponding rich media control to process the rich media information, only a last invoked rich media control is executed in a case that different rich media controls are invoked for the same rich media information consecutively.

7. The method according to claim 1, wherein: in a process of running the corresponding rich media control to process the rich media information, if the client side in the micro web log system does not support a format of the rich media information format, a client side user is allowed to select a rich media information player to display the rich media information.

8. The method according to claim 1, wherein the operation type of the rich media information further comprises: an operation performed by a client side user of the micro web log system for a page element on a page.

9. The method according to claim 1, wherein: the sending, by the microblog terminal, the classified filtering instruction to the microblog server side when detecting that the user performs the filtering operation on the current message list comprises:
 encapsulating, by the microblog terminal, a message index ID list of the current message list to generate the classified filtering instruction when detecting that the user performs a filtering operation on the current message list; and
 sending, by the microblog terminal, the classified filtering instruction to the microblog server side.

10. The method according to claim 9, wherein: after the microblog terminal sends the classified filtering instruction to the microblog server side, and before the microblog terminal receives the rich media types available for filtering in the current message list returned by the microblog server side, the method further comprises:
 extracting, by the microblog server side, a message body corresponding to each message index ID in the message index ID list according to the message index ID list in the classified filtering instruction;
 analyzing, by the microblog server side, the message body corresponding to each message index ID, and determining a message type of each message in the current message list; and
 returning, by the microblog server side, rich media types available for filtering in the current message list to the microblog terminal according to all message types in the current message list, wherein
 the message types comprise text type and/or rich media type; and
 the rich media type comprises at least one of image type, music type and video type.

11. The method according to claim 1, wherein: the sending, by the microblog terminal, the get-message instruction to the microblog server side when the user selects any one rich media type in the rich media types available for filtering comprises:
 encapsulating, by the microblog terminal, a message index ID list of the current message list together with an identifier of the selected rich media type to generate the get-message instruction when detecting that the user selects any one rich media type in the rich media types available for filtering; and
 sending, by the microblog terminal, the get-message instruction to the microblog server side.

12. The method according to claim 11, wherein: after the microblog terminal sends the get-message instruction to the microblog server side, and before the microblog terminal receives all the messages of the selected rich media type in the current message list returned by the microblog server side, the method further comprises:
 extracting, by the microblog server side, a message body corresponding to each message index ID in the message index ID list according to the message index ID list in the get-message instruction;
 querying, by the microblog server side, message bodies that comprises the identifier among the extracted message bodies according to the identifier of the selected rich media type in the get-message instruction, and updating the message index ID list in the get-message instruction according to the queried message bodies; and
 returning, by the microblog server side, the updated message index ID list together with the queried message bodies to the microblog terminal, whereupon the microblog terminal creates the list of the messages of the selected rich media type according to the updated message index ID list and the queried message bodies.

13. The method according to any one of claims 9 to 12, wherein: the sending, by the microblog terminal, the export request message to the microblog server side when it is detected that the user performs the export operation on the list of the messages of the selected rich media type comprises:
 encapsulating, by the microblog terminal, a message index ID list corresponding to the list of the messages of the selected rich media type to generate the export request message when detecting that the user performs the export operation on the list of the messages of the selected rich media type; and
 sending, by the microblog terminal, the export request message to the microblog server side.

14. The method according to claim 13, wherein: after the microblog terminal sends the export request message to the microblog server side, and before the microblog terminal receives the rich media export address returned by the microblog server side, the method further comprises:
 extracting, by the microblog server side, a message body corresponding to each message index ID in the message index ID list according to the message index ID list in the export request message;
 parsing, by the microblog server side, a rich media uniform resource locator (URL) address incorporated in the extracted message body, processing the URL address, and obtaining the rich media export address; and
 returning, by the microblog server side, the rich media export address to the microblog terminal, wherein the rich media comprise at least one of images, music and videos.

15. The method according to claim 14, wherein: when the selected rich media type is an image type, the parsing, by the microblog server side, the rich media URL address incorporated in the extracted message body, the processing the URL address, and the obtaining the rich media export address comprises:
parsing, by the microblog server side, an image URL address incorporated in the extracted message body;
downloading, by the microblog server side, corresponding images according to the image URL address obtained through parsing, compressing and encapsulating all the downloaded images, and generating and storing an image export package; and
using, by the microblog server side, a storage address of the image export package as an image export address.

16. The method according to claim 14, wherein: when the selected rich media type is a music type or a video type, the parsing, by the microblog server side, the rich media URL address incorporated in the extracted message body, the processing the URL address, and the obtaining the rich media export address comprises:
parsing, by the microblog server side, a music URL address or video URL address incorporated in the extracted message body; and
compressing and encapsulating, by the microblog server side, the music URL address or video URL address obtained through parsing, and obtaining a music export address or video export address.

17. An apparatus for processing micro web log messages, comprising: a processor and a non-transitory processor-readable medium, the processor executing program codes stored in the non-transitory processor-readable medium, which configures the apparatus to:
configure a rich media control, wherein the rich media control is obtained by encapsulating rich media information processing logics according to an operation type and a media type of rich media information;
receive an operation request for processing rich media information in a micro web log message; and
invoke a corresponding rich media control according to the operation type and the media type of the requested rich media information, and run the corresponding rich media control to process the rich media information, wherein the micro web log message is unable to be edited by invoking and running the corresponding rich media control;
wherein: the apparatus is specifically configured to receive an operation request for loading rich media information; and
invoke a rich media control to load corresponding media information according to one of or any combination of the following configuration information items:
a display priority level set for a media type;
a display/hide attribute set for the media type; and quantity of displayed rich media information set for the media type;
wherein: the apparatus is specifically configured to invoke the corresponding rich media control according to the operation type and the media type of the requested rich media information, and run the corresponding rich media control to process the rich media information comprises:
send a classified filtering instruction to a microblog server side when detecting that a user performs a filtering operation on a current message list, receive rich media types available for filtering in the current message list returned by the microblog server side, and display the rich media types available for filtering;
send a get-message instruction to the microblog server side when the user selects any one rich media type among the rich media types available for filtering, receive all messages of the selected rich media type in the current message list returned by the microblog server side, and display a list of the messages of the selected rich media type; and
send an export request message to the microblog server side when it is detected that the user performs an export operation on the list of the messages of the selected rich media type, receive a rich media export address returned by the microblog server side, and download all rich media in the list of the messages of the selected rich media type according to the rich media export address.

18. The apparatus according to claim 17, wherein: the configuration information is bound to an installation program or an update program of each version of a client side in a micro web log system respectively; and
the apparatus is specifically configured to set the configuration information into a micro web log client side in a process of installing or updating the micro web log client side.

19. The apparatus according to claim 17, wherein: the apparatus is specifically configured to receive a request for operating a page element from a client side user in a micro web log system; and
determine a media type of rich media information corresponding to the page element according to the page element operated by the user, invoke a corresponding rich media control according to the media type and the user's operation type, use attribute parameters of the rich media information corresponding to the page element as input parameters of the corresponding rich media control, and run the corresponding rich media control to process the rich media information corresponding to the page element.

20. The apparatus according to claim 17, wherein the apparatus is further configured to: in a process of running the corresponding rich media control to process the rich media information, reject an operation of downloading the rich media information repeatedly in a case of downloading the same rich media information repeatedly.

21. The apparatus according to claim 17, wherein: the apparatus is further configured to: in a process of running the corresponding rich media control to process the rich media information, execute only a last invoked rich media control in a case that different rich media controls are invoked for the same rich media information consecutively.

22. The apparatus according to claim 17, wherein the apparatus is further configured to: in a process of running the corresponding rich media control to process the rich media information, if the client side in the micro web log system does not support a format of the rich media information, allow a client side user to select a rich media information player to display the rich media information.

23. The apparatus according to claim 17, wherein the apparatus is specifically configured to:
display a current message list, send a classified filtering instruction to the microblog server side when detecting that a user performs a filtering operation on the current message list, receive rich media types available for filtering in the current message list returned by the microblog server side, and display the rich media types available for filtering;

send a get-message instruction to the microblog server side when the user selects any one rich media type among the rich media types available for filtering that are displayed, receive all messages of the selected rich media type in the current message list returned by the microblog server side, and display a list of the messages of the selected rich media type; and when it is detected that the user performs an export operation on the list of the messages of the selected rich media type, wherein the list of messages is displayed, send an export request message to the microblog server side, receive a rich media export address returned by the microblog server side, and download rich media in the list of the messages of the selected rich media type according to the rich media export address.

24. The apparatus according to claim 23, wherein apparatus is specifically configured to:

present the current message list;

encapsulate a message index ID list of the current message list to generate the classified filtering instruction when the user performs a filtering operation on the presented current message list;

send the generated classified filtering instruction to the microblog server side, and receive rich media types available for filtering in the current message list returned by the microblog server side; and display the rich media types available for filtering that are received.

25. The apparatus according to claim 23, wherein the apparatus is specifically configured to:

when detecting that the user selects any one rich media type in rich media types available for filtering, wherein the rich media types are displayed, encapsulate a message index ID list of the current message list together with an identifier of the selected rich media type to generate the get-message instruction;

send the generated get-message instruction to the microblog server side, and receive a message index ID list and message bodies of all messages of the selected rich media type in the current message list returned by the microblog server side; and according to the message index ID list and the message bodies of the messages of the selected rich media type, wherein the list and the message bodies are received, create a list of the messages of the selected rich media type, and display the list of the messages of the selected rich media type.

26. The apparatus according to claim 23, wherein the apparatus is specifically configured to:

when detecting that the user performs the export operation on the list of the messages of the selected rich media type, wherein the list is presented, encapsulate a message index ID list corresponding to the list of the messages of the selected rich media type to generate the export request message;

send the generated export request message to the microblog server side, and receive the rich media export address returned by the microblog server side; and download all rich media in the list of the messages of the selected rich media type according to the received rich media export address.

* * * * *